United States Patent
Hillman et al.

[11] Patent Number: 5,547,352
[45] Date of Patent: Aug. 20, 1996

[54] CRANKSHAFT DRIVEN RECIPROCATING PISTON PUMP HAVING PLURAL GUIDE RODS

[76] Inventors: Darrel D. Hillman; Charles T. Russell, Jr., both of P.O. Box 1325, Mineral Wells, Tex. 76068

[21] Appl. No.: 521,967

[22] Filed: Aug. 31, 1995

[51] Int. Cl.$^6$ .................. F04B 53/10; F16J 1/00
[52] U.S. Cl. .................. 417/569; 92/166; 92/110
[58] Field of Search .................. 417/415, 437, 417/497, 569; 92/165 R, 166, 109, 110

[56] References Cited

U.S. PATENT DOCUMENTS

| | | | |
|---|---|---|---|
| 2,348,567 | 5/1944 | Parker | 92/166 |
| 2,710,137 | 6/1955 | Arnouil | 417/490 |
| 3,146,684 | 9/1964 | Vanderhoof | 92/165 R |
| 3,259,308 | 7/1966 | Bennett | 417/497 |

Primary Examiner—Richard E. Gluck
Assistant Examiner—Roland G. McAndrews, Jr.
Attorney, Agent, or Firm—Arthur F. Zobal

[57] ABSTRACT

The pump is formed by a body having a cavity with a cylindrical chamber in which a piston is reciprocated toward and away from an inlet and outlet aperture. A crank shaft extends through an aperture formed through the piston transverse to its axis and through opposite walls of the cavity. The crank shaft has a cam located in the piston aperture. Upon rotation of the crank shaft, the cam alternately engages opposite facing cam surfaces of the piston in the piston aperture to reciprocate the piston to draw fluid into the chamber from an inlet path and then to pump the fluid out through an outlet path. The piston has spaced apart O-rings on its outer wall which engage the chamber wall upon reciprocation of the piston.

3 Claims, 9 Drawing Sheets

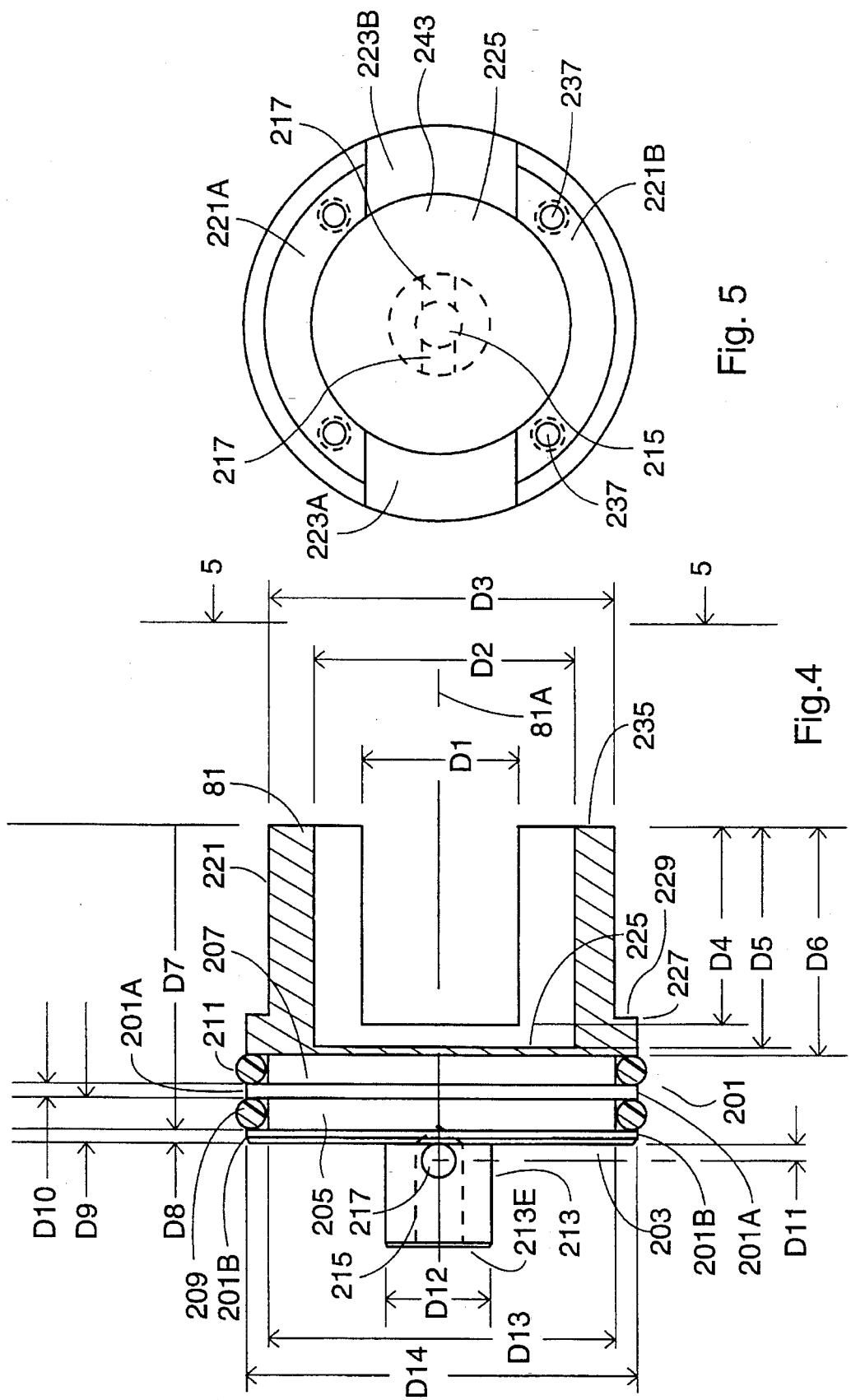

Fig. 16
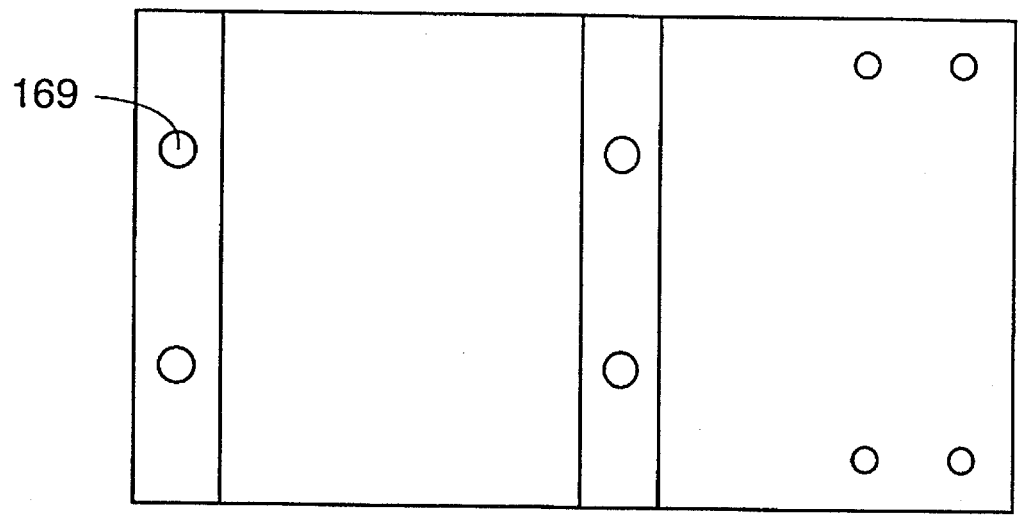
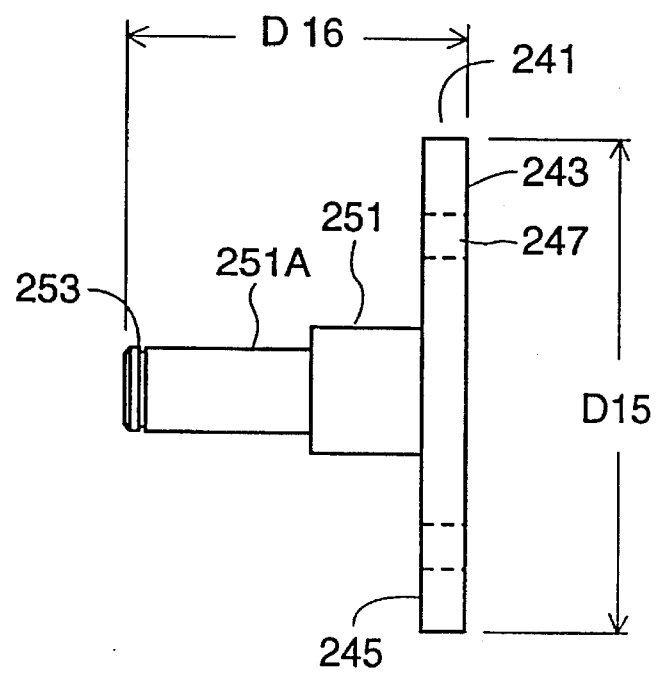
Fig. 6

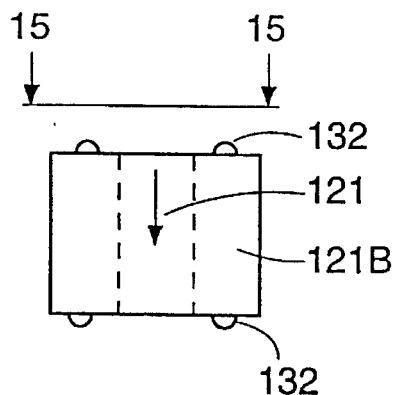
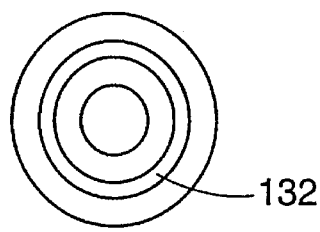
Fig. 14             Fig. 15
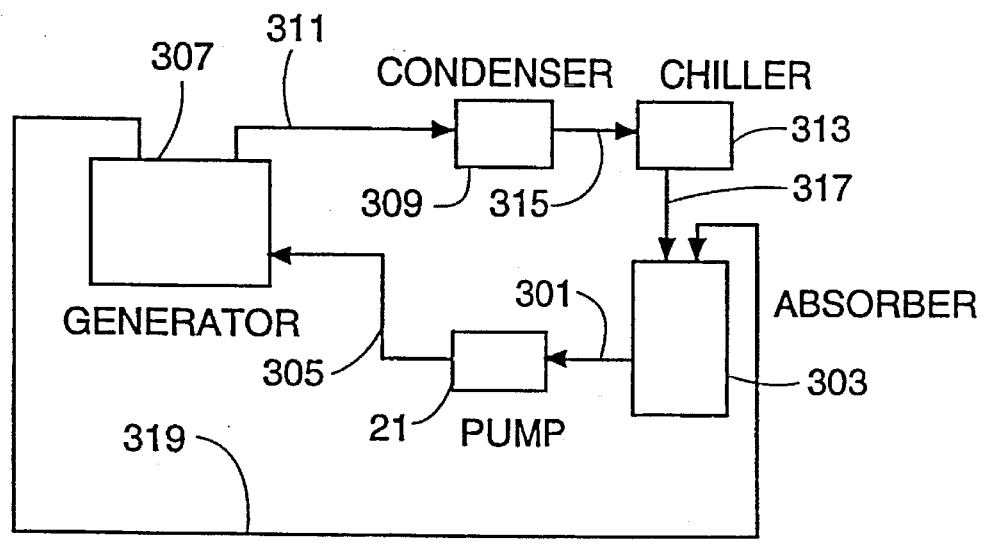
Fig. 17
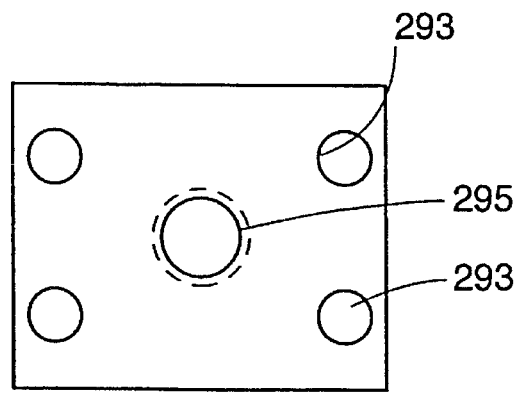
Fig. 13

5,547,352

CRANKSHAFT DRIVEN RECIPROCATING PISTON PUMP HAVING PLURAL GUIDE RODS

BACKGROUND OF THE INVENTION

1. Field of the Invention

The invention relates to a pump for pumping fluid in an ammonia refrigeration system.

2. Description of the Prior Art

An ammonia refrigeration system generally comprises a generator, a condenser, a chiller, an absorber and a pump for pumping fluid from the absorber to the inlet of the generator.

SUMMARY OF THE INVENTION

It is an object of the invention to provide a new and useful fluid pump useful in an ammonia refrigeration system.

The pump comprises a body having a cavity including a cylindrical chamber for supporting a piston for reciprocation between in first and second opposite directions in the chamber. First and second axially located guide apertures extend into the walls of the pump body. The piston has first and second opposite ends with first and second axially located guide rods which are located in the first and second guide apertures respectively. The first guide rod has an axial aperture and a radial aperture in fluid communication with each other. A one way inlet valve is located in the first aperture upstream of the first guide rod for allowing fluid flow only into the chamber by way of the first aperture. An outlet aperture extends through the wall of the body transverse to the axis of the chamber in fluid communication with the first aperture between the one way inlet valve and the chamber. A one way outlet valve is located in the outlet aperture to allow fluid flow only from the outlet aperture out of the pump. A crank shaft receiving aperture is formed through the piston transverse to its axis. Diametrically opposed crank shaft apertures are formed through the body in communication with the cavity of the body transverse to the axis of the chamber. A rotatable crank shaft extends through the crank shaft apertures of the body and through the crank shaft aperture of the piston. The crank shaft has a cam located in the crank shaft receiving aperture of the piston for alternately engaging two cam surfaces axially spaced apart and facing each other in the crank shaft receiving aperture of the piston for reciprocating the piston upon rotation of the crank shaft. Upon movement of the piston in the second direction, the one way inlet valve allows fluid to flow into the chamber by way of the axial and radial apertures of the first guide rod and upon movement of the piston in the first direction, the piston causes fluid in the chamber to be forced outward through the one way outlet valve by way of the radial and axial apertures.

In a further aspect two spaced apart O-ring seals are located at the first end of the piston for engaging the interior wall of the chamber.

BRIEF DESCRIPTION OF THE DRAWINGS

FIG. 4 is a cross-sectional view of the piston of the pump.

FIG. 5 is a view of FIG. 4 as seen along lines 5—5 thereof.

FIG. 6 is a side view of the bottom lid of the piston.

FIG. 13 is a plan view of the inlet cap of the pump.

FIG. 14 is a side view of a one way valve used in the invention.

FIG. 15 is a view of FIG. 14 as seen along lines 15—15 thereof.

FIG. 16 is a top plan view of the base plate.

FIG. 17 is a block diagram of an ammonia refrigeration system.

DESCRIPTION OF THE PREFERRED EMBODIMENT

Figure 1:
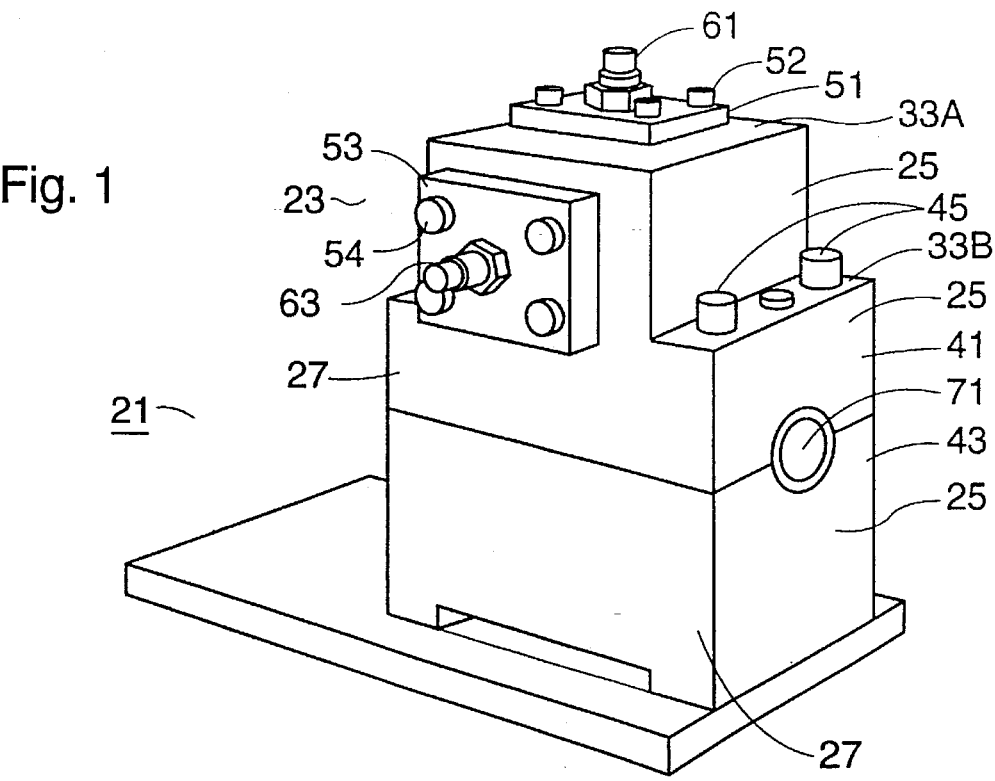
FIG. 1 is an isometric view of the pump of the invention showing the inlet and outlet and an end of the crank shaft.
Figure 2:
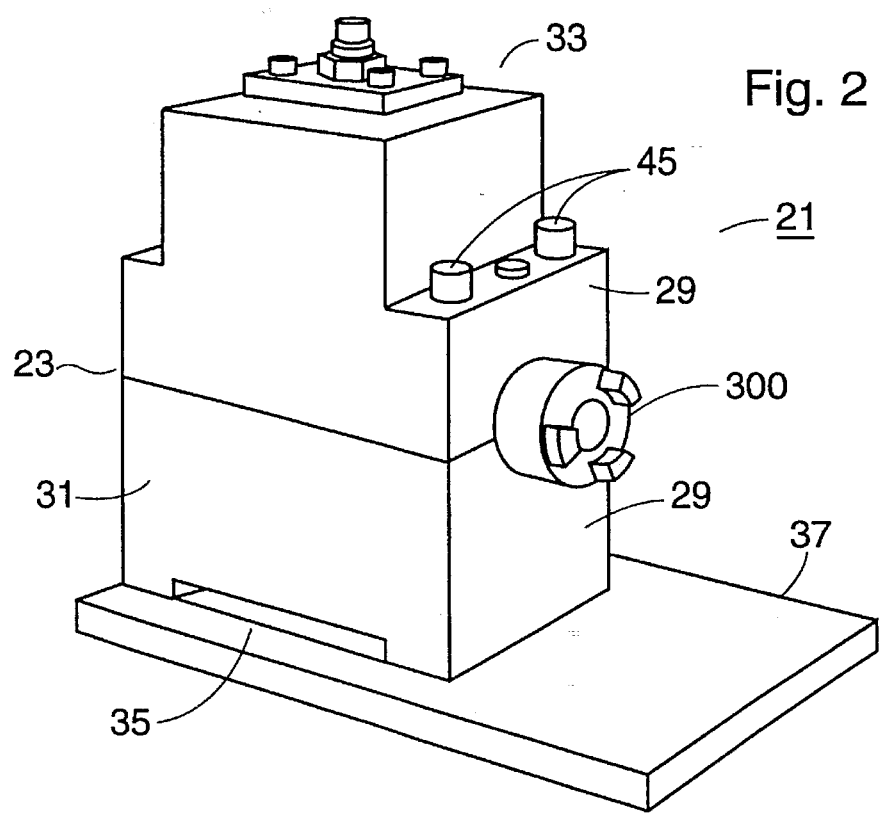
FIG. 2 is an isometric view of the pump of FIG. 1 showing the drive connector for use for rotating the crank shaft.
Figure 3:
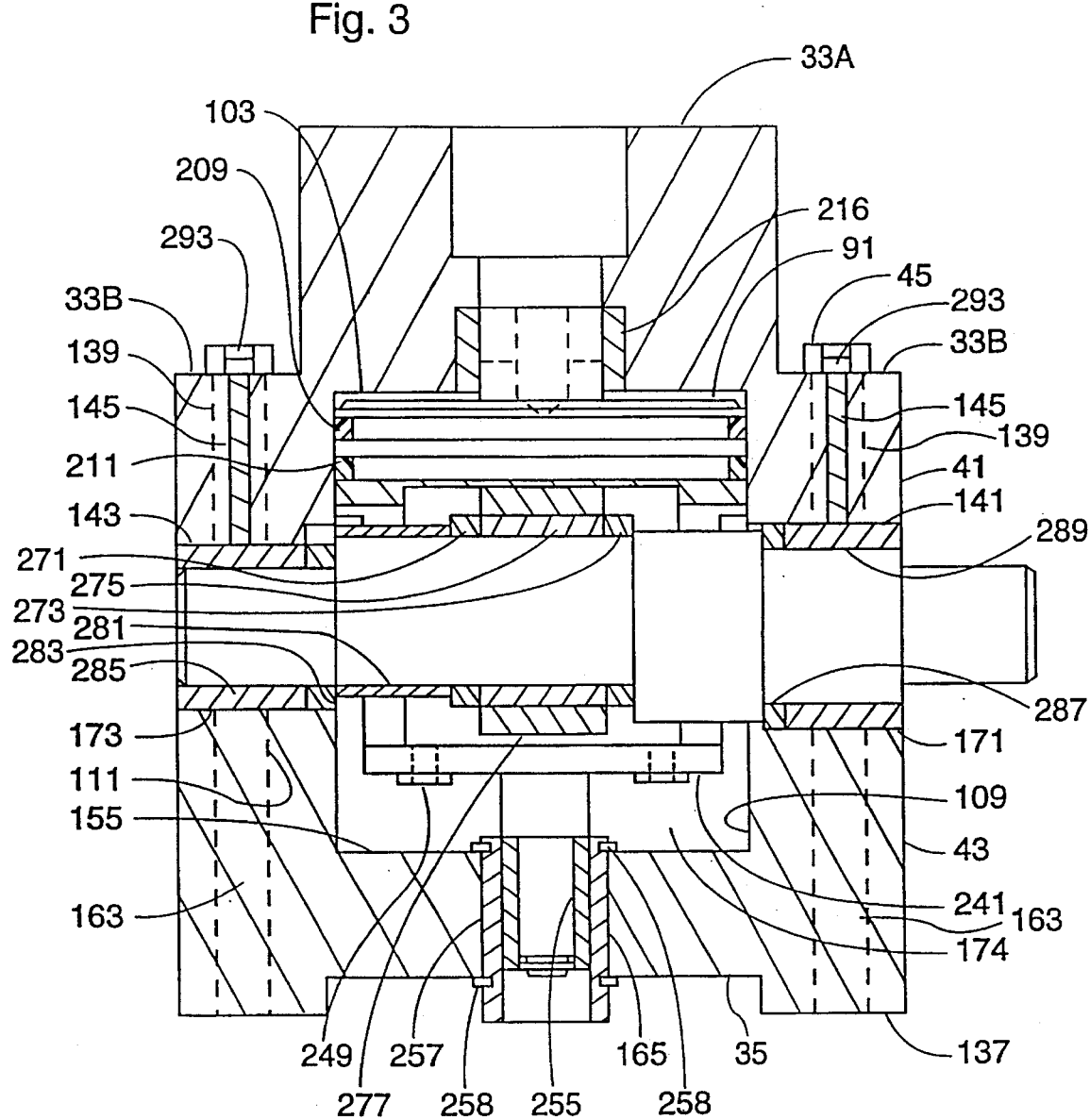
FIG. 3 is a cross-sectional view of the pump showing the piston in the piston chamber and the crank shaft.

Referring now to FIGS. 1–3, the pump of the invention is identified by reference numeral 21. It is comprised of a body 23 having four sides 25, 27, 29, and 31, a top end 33 and a bottom end 35 secured to a base plate 37. The body 23 is formed of a base metal block 43 and a top metal block 41 secured together with bolts 45. Block 41 has the top end 33 and base block 43 has the bottom end 35. The sides 25 and 27 of the top block 41 are stepped in that ledges 33B are provided such that the sides 27 and 31 each are in the form of an inverted T with a top at 33A. Caps 51 and 53 are secured to the top portion 33A and to the side 27 of block 41 respectively by bolts 52 and 54 and support inlet and outlet fittings 61 and 63 respectively. Fittings 61 and 63 are identical. Caps 51 and 53 are identical. A crank shaft 71 extends through the body for reciprocating a piston 81 (FIG. 4) located in a chamber or cavity 91 of the body 41 for causing fluid to be drawn into the chamber 91 from the inlet fitting 61 and then forced out from the chamber through outlet fitting 63.

As shown in FIG. 17, in an ammonia refrigeration system, the inlet fitting 61 may be coupled to a conduit 301 extending from an absorber 303, and the outlet fitting 63 may be coupled to a conduit 305 extending to a generator 307 to pump fluid from the absorber 303 to the generator 307. In the system shown, ammonia gas is applied from the generator 307 to a condenser 309 by way of conduit 311; the output of condenser 309 is applied to a chiller 313 by way of a conduit 315 and the output of the chiller 313 is applied to the absorber 303 by way of conduit 317. Conduit 319 extends from the generator 307 to apply water back to the absorber 303. The pump takes the combined ammonia-water solution from the absorber and pumps it into the generator against the pressure head.

Figure 7:
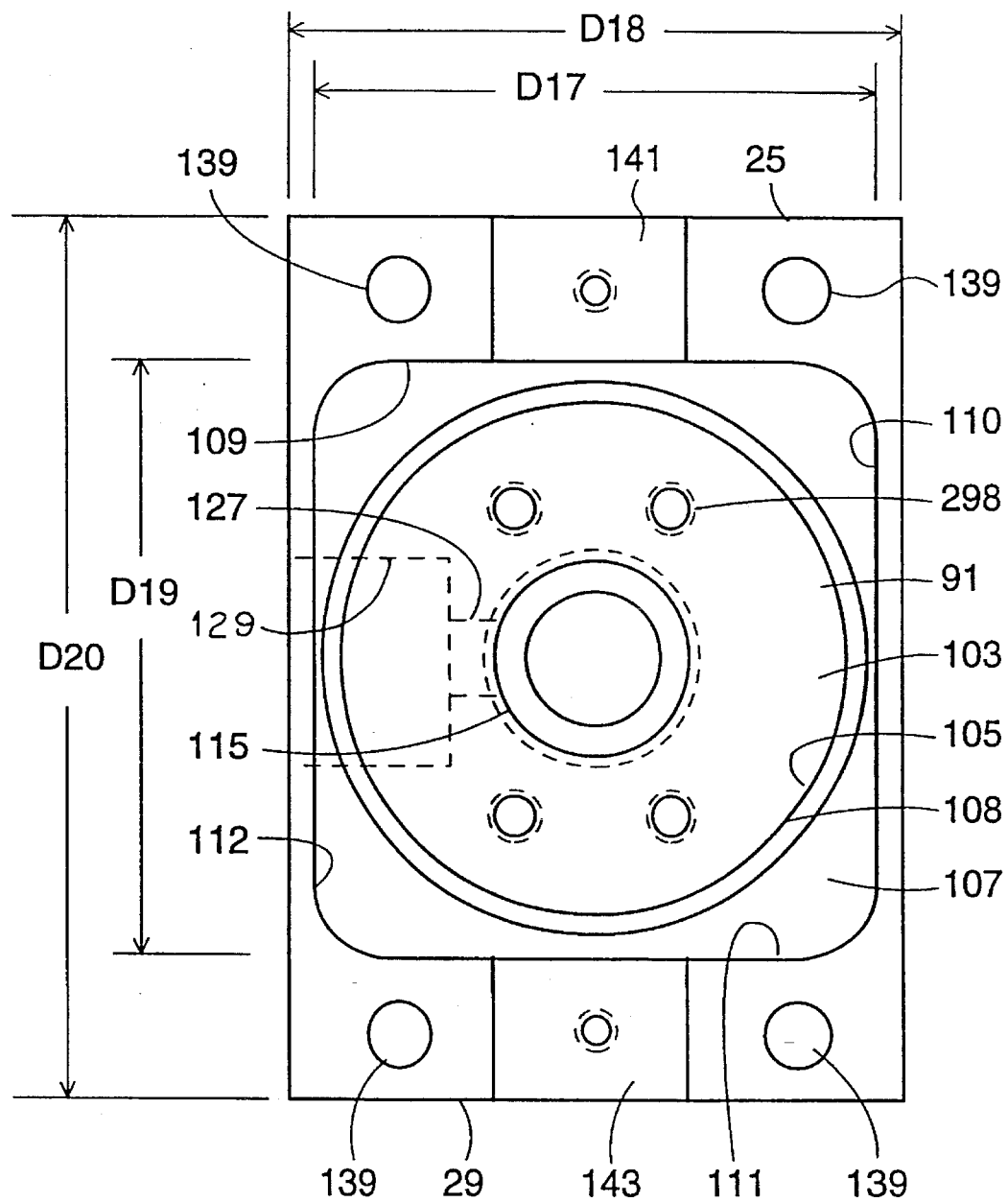
FIG. 7 is a plan view of the inside of the top block of the pump showing the cylindrical chamber for the piston.

Referring again to the pump 21, the top block 41 (FIG. 3) has a cylindrical chamber 91 with at top wall 103 and a cylindrical side wall 105 (FIG. 7) which extends to a rectangular chamber by way of a shoulder 108. The chamber 107 has four side walls 109, 110, 111, and 112. The top wall has a cylindrical guide rod aperture 115 formed therein which leads to a smaller diameter cylindrical aperture 117 which in turn leads to an upper cylindrical aperture 119 which receives a one way valve 121 which allows fluid flow only in the direction of the arrow 123. The fitting 61 allows fluid flow to the valve 121 by way of opening 125.

A cylindrical aperture 127 is in fluid communication with a apertures 115 and 117. Aperture 127 leads to cylindrical aperture 129 in which a one way outlet valve 131 is located. Valve 131 allows fluid flow only in the direction of the arrow 133. The fitting 63 allows fluid flow from the valve 131 by way of opening 135. Valves 121 and 131 are press fitted into valve bodies 121B and 131B which are slip fitted into the apertures 119 and 129.

The bottom of the block 41 has a flat surface 137. Four threaded bolt holes 139 extend from ledge 33B to the surface 137. Two semicircular grooves 141 and 143 are formed in the flat wall 137 from sides 25 and 29 leading to the chamber 107. Two threaded bolt holes 145 extend from ledge 33B to the upper ends of the grooves 141 and 143.

The top of the block 43 has a flat surface 151 with a rectangular chamber 153 extending downward to a bottom surface 155. The chamber 153 has four side walls 159, 160, 161, 162. The bottom wall 155 has a central guide rod receiving aperture 165 extending therethrough. In addition, four threaded bolt holes 291 extend through the bottom wall 156 for receiving bolts (not shown) for bolting the base block 43 to the base member 37. Two semicircular grooves 171 and 173 are formed in the surface 151 from sides 25 and 29 to the chamber 153.

The two blocks 41 and 43 are bolted together for forming a cavity 174 including the piston chamber 91 and for forming two crank shaft apertures formed by grooves 141, 171 and 143, 173.

Four threaded apertures 163 extend through the block 43 for use in bolting the two blocks together. The piston 81 and the crank shaft 71 are located in the chamber 91 and the cavity 174 with end of the crank shaft 71 located in the apertures 141, 171 and 143, 173.

Referring to FIGS. 3, 4, and 5, the piston 81 comprises a circular surface 201 having an upper surface 203 and two spaced apart annular grooves 205 and 207 for receiving two elastomer O-rings 209 and 211 respectively. A central guide rod 213 extends from the surface 203. An axial aperture 215 is formed in the rod 213 from its end 213E to the plane of the surface 203. Two radial apertures 217 extend into the rod 213 at the surface 203 from opposite sides intercepting the aperture 215. An annular shaped linear bearing 216 (See FIG. 3) is press fitted in the aperture 119 within which the rod 213 can slide upon reciprocation of the piston 81.

A hollow cylindrical wall 221 extends from the back side of the wall 201 having two diametrically opposed annular slots 223A and 223B formed defining two arcuate wall sections 221A and 221B. The bottom side of the wall 201 has to a circular surface 225. The outer edge of the wall 201 has a circular ridge 227 having the same diameter as that of circular ridges 201A and 201B defining the two annular slots 205 and 207. The outside diameter of the wall sections 221A and 221B is less than that of the ridge 227 with a shoulder 229 therebetween. The ends 235 of the wall sections 221A and 201B are flat. Four threaded apertures 237 are formed in the flat surfaces 237 of the wall sections 221A and 221B.

A circular bottom lid 241 (FIG. 6) is provided having a front side 243 and a bottom side 245. Bolt holes 247 are formed through the lid 241 for alignment with the apemares 237. The lid 241 is attached to the flat surfaces 235 of the wall sections 221A and 221B with bolts 249 which extend through apertures 247 and are screwed into apertures 237 as shown in FIG. 3. This forms a crank shaft aperture 223A, 223B extending through the piston 81 transverse to its axis 81A.

The bottom side of the lid 241 has a cylindrical guide rod 251 extending therefrom. The rod 251 has a smaller diameter rod 251A extending therefrom with an annular snap ting holding slot 253 formed therein. A hardened sleeve 255 (See FIG. 3) is press fitted around the rod 251. A linear ring shaped bearing 257 is located in the aperture 165 of the bottom wall 155 of base block 43 within which the rod 251 slides upon reciprocation of the piston 81. The bearing 257 is held in place by snap rings 258.

Figure 12:
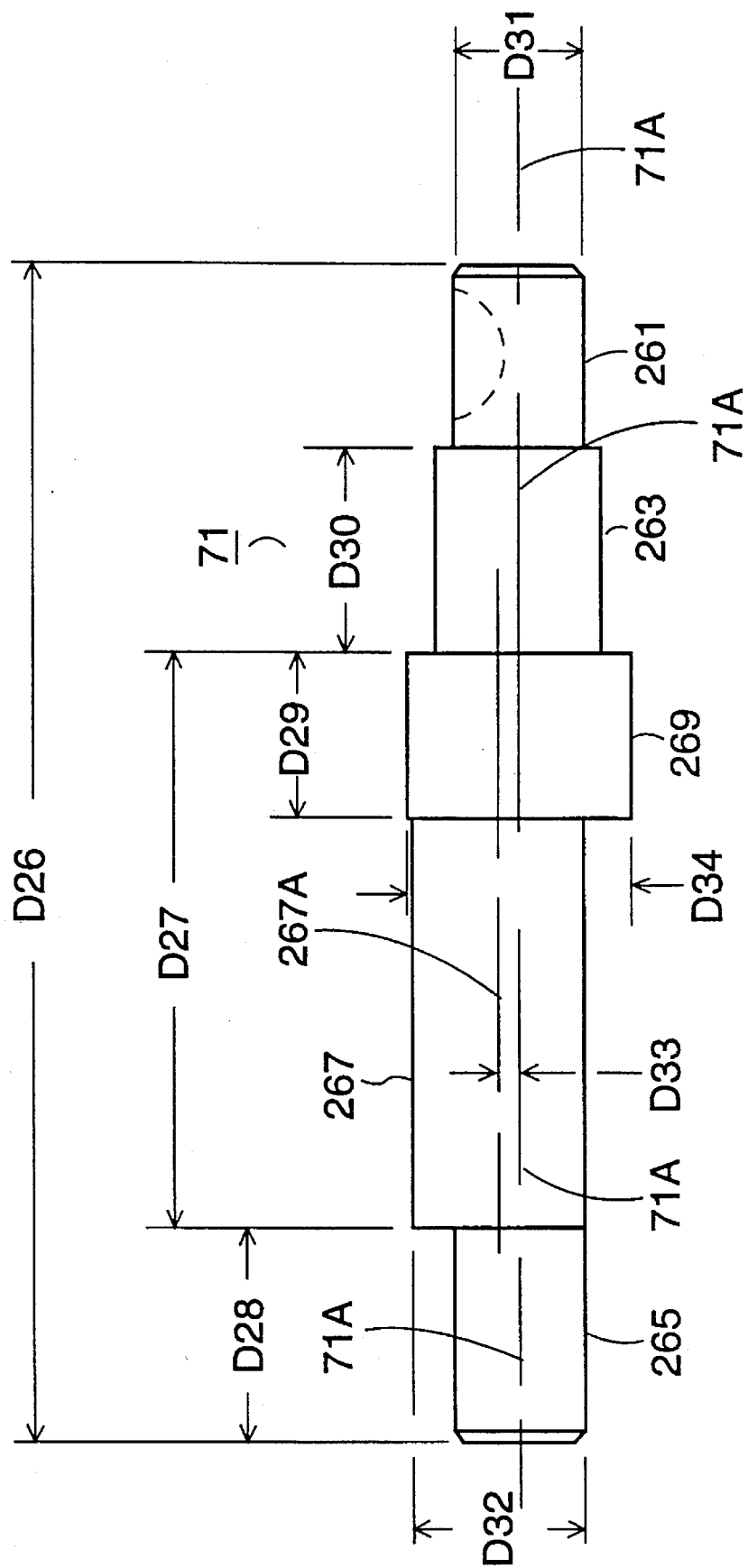
FIG. 12 is a side view of the crank shaft of the pump without any bearings etc. thereon.

Referring to FIGS. 3 and 12 the crank shaft 71 comprises a cylindrical drive end 261, two cylindrical bearing portions 263 and 265, a cylindrical cam portion 267 and a cylindrical stop portion 269. The axis 267A of cam portion 267 is offset from the axis 71A of the rest of the shaft a small amount which in the preferred embodiments is ³⁄₃₂ of an inch. Annular thrust bearings 271 and 273 are located around the cam portion 267 on opposite sides of an annular bearing 275 around which is located an annular roller 277. Cam portion 267, beating 275 and roller 277 form a cam for reciprocating the piston. Member 281 is an annular spacer; member 283 is an annular thrust bearing; and member 285 is an annular beating press fitted around shah end 265. Member 287 is an annular thrust bearing and member 289 is an annular beating press fitted around shaft position 263.

In assembling the pump, the shaft 71 with the beatings, spacer and roller is located in the openings 223A, 223B of the piston 81 and the bottom lid 241 is secured to the bottom wall 235 of the cylindrical portions 221A and 221B. The guide rod 213 is inserted into the upper bearing 216 and the guide rod 251 is inserted into the lower bearing 257 of the blocks 41 and 43 respectively. The block walls 137 and 151 are moved together with the bearings 285 and 289 located in the shaft apertures 143, 173 and 141, 171 respectively. Bolts 45 are inserted through apertures 139 and screwed into apertures 163 to secure the two blocks 41 and 43 together with the piston 81 and shaft 71 located in the chamber 91 and cavity 174 and the shaft ends located in the shaft apertures 141, 171 and 143, 173. Set screws 293 are screwed into apertures 145 until they engage the bearings 285 and 289 to hold the bearings stationary relative to the block 41. Upon assembly of the pump, holes 170 formed through block 43 are aligned with the lid bolts 249. Final adjustment of the lid 241 to the piston 81 is made by inserting Allen head wrenches through holes 170 of the block to engage and adjust the lid bolts 249. The one way valves 121 and 131 are press fitted into the valve bodies 121B and 131B and the valve bodies are slip fit into the apertures 119 and 129 respectively. The valves 121 and 131 are identical as are the valve bodies. In FIG. 14 valve 121 and valve body 121B are shown. As shown in FIGS. 14 and 15, each valve body has O-rings 132 located in annular grooves formed in its opposite wall edges. The inward facing O-rings 132 of the valve bodies 121B and 131B will seat against shoulders 119S and 129S of apertures 119 and 129. The block 43 can be attached to the base 37 by screwing bolts (not shown) through plate apertures 169 into threaded apertures 291 formed in the base 37.

Figure 8:
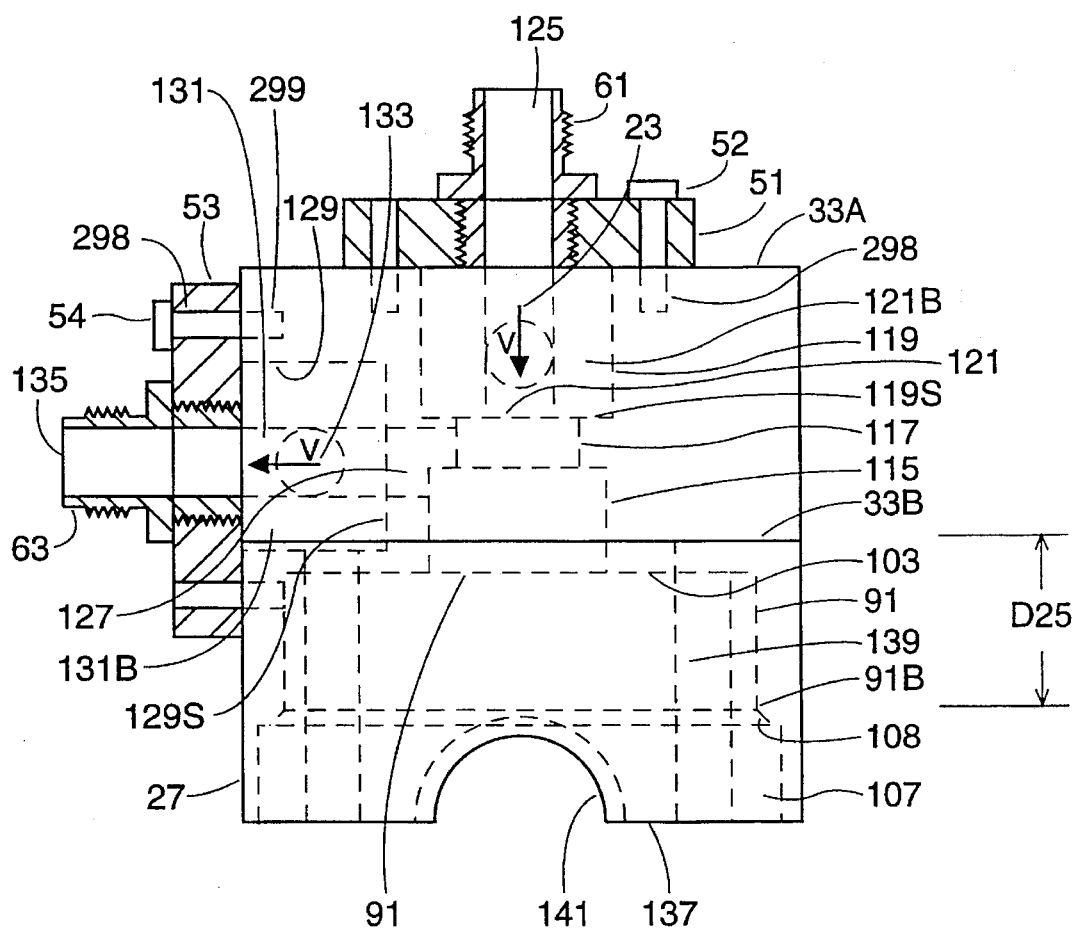
FIG. 8 is a side view of the top block of the pump.
Figure 9:
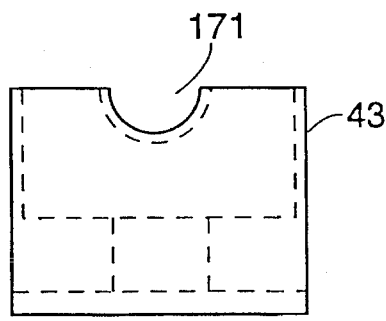
FIG. 9 is a side view of the base block of the pump.
Figure 10:
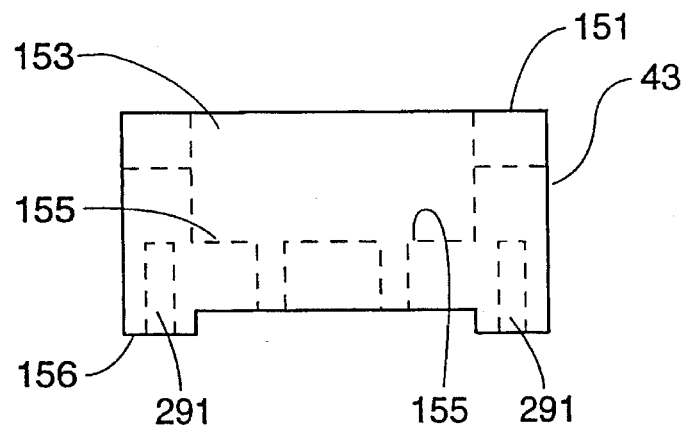
FIG. 10 is a side view of the base block of the pump rotated 90 degrees from that of FIG. 7.
Figure 11:
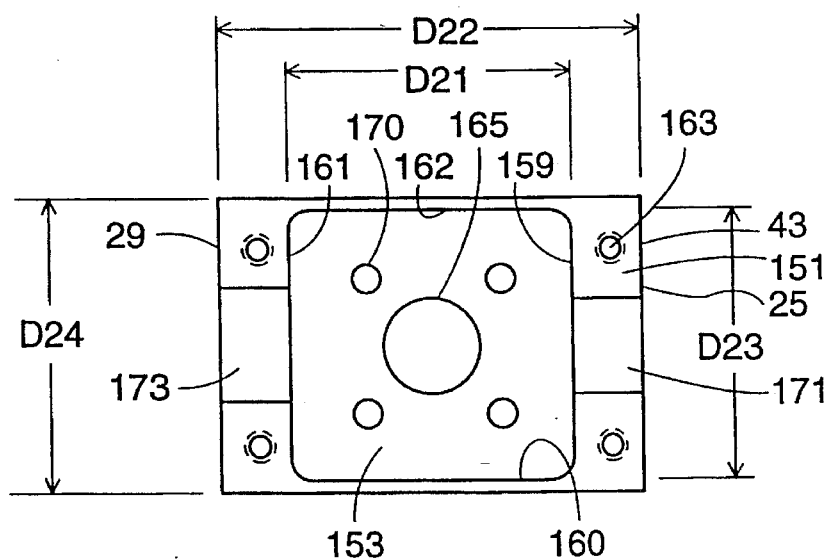
FIG. 11 is a plan view of the inside of the base block of the pump.

The two fitting caps 51 and 53 are identical. As seen in FIGS. 8 and 13 the caps 51 has four outer apertures 293 and a central threaded apertures 295. The fittings 61 and 63 are identical. They are screwed into central apertures 295 of the caps 51 and 53. The caps 51 and 53 are located in place on surfaces 33A and 27 with the apertures 125 and 135 aligned with apertures 119 and 129 respectively and attached to the block 41 with bolts 52 and 54 which are screwed into threaded apertures 298 and 299 formed in surfaces 33A and 27. The caps 51 and 53 bear against the valve outer O-rings 132 of the valve bodies 121B and 131B.

As shown in FIG. 2, a drive connector 300 is connected to the drive member 261 of the shaft 71 to allow rotation of the shaft by a motor. Upon rotation of the shaft 71, the roller 275 of the cam alternately engages cam surfaces 225 and 243 of the piston 81, causing the piston to reciprocate in the chamber 91. In FIG. 3, the piston is shown in its upper most position. In this position cam roller 277 engages the piston surface 225 but is spaced from the piston surface 243 about 0.003–0.005 of an inch. The piston stroke is about 3/16 of an inch. As the cam shaft 71 rotates 90 degrees and the cam roller 275 engages the piston surface 243 to move the piston downward, a suction is drawn in the inlet including aperture 117, which causes fluid to flow from inlet 61, through the one way inlet valve 121 into the chamber formed between piston surface 203 and the upper chamber wall 103. Flow into the chamber is by way of axial aperture 215 and radial apertures 217 of the guide rod 213. As the piston moves downward, the radial apertures 217 are moved into the chamber 91 between surfaces 203 and 103.

As the shaft 71 continues to rotate another 90 degrees causing the cam roller 277 to engage the piston surface 255 and move the piston upward, fluid in the chamber between surfaces 203 and 103 is forced outward by way of radial apertures 217 and axial apertures 215 into apertures 117 and transverse connecting apertures 127, through the valve 131 and outlet fitting 63.

The cylindrical chamber 91 of the pump in which the top wall 201 of the piston including ridges 201A, 201B and O-rings 209 and 211 and surface 227 reciprocate in extends from the upper chamber wall 103 to the bottom edge 91B as seen in FIG. 8. Thus the piston stroke is short, 3/16 of an inch in the preferred embodiment. The top O-ring 209 seals the piston to the cylindrical wall 91. The piston operates in a fluid solution with a high concentration of ammonia. It gets lubrication from the bottom O-ring 211 which captures grease between the two O-rings. As the bottom O-ring 211 advances in the cylinder 91, the bottom O-ring 211 applies grease on the cylinder wall. The blocks 41, 43, piston 81, piston extension 241 and the crank shaft 71 are formed of a suitable metal.

In one embodiment, the components of the pump have the following dimensions. These dimensions are in inches. It is to be understood that the components of the pump could have other dimensions.

D1=1.320
D2=2.25
D3=3.00
D4=1.700
D5=1.880–1.885
D6=1.941
D7=1.57
D8=0.093
D9=0.229
D10=0.093
D11=0.127
D12=0.873–0.874
D13=3.020
D14=3.365–3.367
D15=3.00
D16=1.94
D17=3.75
D18=4.00
D19=3.875
D20=5.875
D21=3.875–3.878
D22=5.875
D23=3.75
D24=4.00
D25=1.010
D26=6.879
D27=3.471–3.474
D28=1.204
D29=1.033
D30=1.204
D31=0.7495–0.7998
D32=0.9987–0.9997
D33=0.093
D34=1.25

We claim:

1. A pump for pumping a fluid, comprising:

a body having a surrounding wall forming a cavity with a cylindrical chamber with opposite first and second ends and with an axis extending between said first and second ends, a piston located in said chamber for movement in first and second opposite directions between said first and second opposite ends respectively of said chamber, said piston having first and second opposite ends with an axis extending therebetween such that said first and second ends of said piston move toward and away from said first and second ends of said chamber respectively upon movement of said piston in said first direction and away from and toward said first and second ends of said chamber respectively upon movement of said piston in said second direction, first and second apertures extending in said body from said first and second ends of said chamber respectively along the axis of said chamber, first and second guide rods extending from said first and second ends of said piston respectively along the axis of said piston, said first and second guide rods being movable in said first and second apertures respectively upon movement of said piston is said first and second directions, inlet and outlet apertures formed in said body in fluid communication with said first aperture, an inlet one way valve located in said inlet aperture for allowing fluid to flow only from the exterior of said pump into said first aperture, an outlet one way valve located in said outlet aperture for allowing fluid to flow only from said first aperture to the exterior of said body, an axial aperture formed in said first guide rod along the axis of said piston, at least one radial aperture formed in said first guide rod transverse to the axis of said piston and in fluid communication with said axial aperture, a crank shaft receiving aperture formed through said piston transverse to the axis of said piston, first and second diametrically opposite crank shaft apertures extending through said wall of said body of said cavity transverse to said axis of said chamber, a crank shaft extending through said crank shaft apertures of said body and through said crank shaft receiving aperture of said piston and supported for rotation, said piston having first and second cam surfaces axially spaced from each other and facing each other in said crank shaft receiving aperture, said crank shaft having a cam located in said crank shaft receiving aperture of said piston such that upon rotation of said crank shaft, said cam alternately engages said first and second cam surfaces of said piston to move said piston in said first and second directions respectively, upon movement of said piston in said second direction, said inlet one way valve allows fluid to flow into said chamber by way of said axial and radial apertures of said first guide rod, upon movement of said piston is said first direction, said piston causes fluid in said chamber to be forced outward through said outlet one way valve by way of said radial and axial apertures of said first guide rod.

2. A pump for pumping a fluid, comprising:

a body having a surrounding wall forming a cavity a cylindrical chamber with opposite first and second ends and with an axis extending between said first and second ends, a piston located in said chamber for movement in first and second opposite directions between said first and second opposite ends respectively of said chamber, said piston having first and second opposite ends with an axis extending therebetween such that said first and second ends of said piston move toward and away from said first and second ends of said chamber respectively upon movement of said piston in said first direction and away from and toward said first and second ends of said chamber respectively upon movement of said piston in said second direction, first and second apertures extending in said body from said first and second ends of said chamber respectively along the axis of said chamber, first and second guide rods extending from said first and second ends of said piston respectively along the axis of said piston, said first and second guide rods being movable in said first and second apertures respectively upon movement of said piston is said first and second directions, inlet and outlet apertures formed in said body in fluid communication with said first aperture, said inlet and outlet apertures being located transversely with respect to each other, an inlet one way valve located in said inlet aperture for allowing fluid to flow only from the exterior of said pump into said first aperture, an outlet one way valve located in said outlet aperture for allowing fluid to flow only from said first aperture to the exterior of said body, an axial aperture formed in said first guide rod along the axis of said piston, at least one radial aperture formed in said first guide rod transverse to the axis of said piston and in fluid communication with said axial aperture, a crank shaft receiving aperture formed through said piston transverse to the axis of said piston, first and second diametrically opposite crank shaft apertures extending through said wall of said body of said cavity transverse to said axis of said chamber, a crank shaft extending through said crank shaft apertures of said body and through said crank shaft receiving aperture of said piston and supported for rotation, said piston having first and second cam surfaces axially spaced from each other and facing each other in said crank shaft receiving aperture, said crank shaft having a cam located in said crank shaft receiving aperture of said piston such that upon rotation of said crank shaft, said cam alternately engages said first and second cam surfaces of said piston to move said piston in said first and second directions respectively, upon movement of said piston in said second direction, said inlet one way valve allows fluid to flow into said chamber by way of said axial and radial apertures of said first guide rod, upon movement of said piston is said first direction, said piston causes fluid in said chamber to be forced outward through said outlet one way valve by way of said radial and axial apertures of said first guide rod.

3. The pump of claim 2, comprising:

first and second spaced apart O-ring seals located at said first end of said piston for engaging the wall of said chamber.

* * * * *